(12) United States Patent
Krekeler et al.

(10) Patent No.: US 7,722,520 B2
(45) Date of Patent: May 25, 2010

(54) ASBESTOS CONTAINMENT COMPOSITION

(75) Inventors: Mark P. S. Krekeler, Centreville, VA (US); Jillian G. Lepp, Arlington, VA (US); Cynthia Tselepis, Arlington, VA (US); Ryan B. Wantz, Cincinnati, OH (US)

(73) Assignee: George Mason University, Fairfax, VA (US)

( * ) Notice: Subject to any disclaimer, the term of this patent is extended or adjusted under 35 U.S.C. 154(b) by 145 days.

(21) Appl. No.: 12/138,541

(22) Filed: Jun. 13, 2008

(65) Prior Publication Data

US 2008/0312487 A1 Dec. 18, 2008

Related U.S. Application Data

(60) Provisional application No. 60/943,794, filed on Jun. 13, 2007.

(51) Int. Cl.
*A62D 101/41* (2007.01)

(52) U.S. Cl. .................. 588/254; 501/141; 501/144; 501/153; 501/154; 501/155

(58) Field of Classification Search ................ 501/155, 501/141, 144, 153, 154; 588/254
See application file for complete search history.

(56) References Cited

U.S. PATENT DOCUMENTS

| | | | | | |
|---|---|---|---|---|---|
| 4,476,235 | A | * | 10/1984 | Chevalier-Bultel et al. | 501/112 |
| 4,786,620 | A | * | 11/1988 | Rittler | 501/147 |
| 4,952,388 | A | * | 8/1990 | Rittler | 423/328.3 |
| 5,543,120 | A | * | 8/1996 | Selby | 423/167.1 |
| 7,419,540 | B2 | * | 9/2008 | Moller et al. | 106/487 |

OTHER PUBLICATIONS

DE 824610 (Dec. 13, 1951) Haefner abstract only.*
JP 51028100 (Aug. 17, 1976) Mori et al. abstract only.*

* cited by examiner

*Primary Examiner*—Paul Marcantoni
(74) *Attorney, Agent, or Firm*—David Yee

(57) ABSTRACT

The compound is a clay aqueous suspension made of at least one 2:1 layer phyllosilicate clay mineral, at least one 1:1 layer phyllosilicate clay mineral, and water that can be used to sequester asbestos, such as chrysotile, as well as dust and other fibrous particles, at all scales of contamination.

12 Claims, 14 Drawing Sheets

---

S105
Create a clay aqueous suspension by mixing at least one 2:1 layer phyllosilicate mineral with at least one 1:1 layer phyllosilicate mineral in a ratio of about 30:70 weight percent to about 70:30 weight percent with water S110
Mechanically separate grains from the clay aqueous suspension S115
Sonicate the clay aqueous suspension for homogenization for at least about 5 minutes S120
Sterilize the clay aqueous suspension

S105
Create a clay aqueous suspension by mixing at least one 2:1 layer phyllosilicate mineral with at least one 1:1 layer phyllosilicate mineral in a ratio of about 30:70 weight percent to about 70:30 weight percent with water

S110
Mechanically separate grains from the clay aqueous suspension

S115
Sonicate the clay aqueous suspension for homogenization for at least about 5 minutes

S120
Sterilize the clay aqueous suspension

FIG. 1

ASBESTOS CONTAINMENT COMPOSITION

CROSS REFERENCE TO RELATED APPLICATIONS

The present application claims the benefit of provisional patent application Ser. No. 60/943,794 to Lepp, filed on Jun. 13, 2007, entitled "Asbestos Containment Composition," which is hereby incorporated by reference.

BRIEF DESCRIPTION OF THE DRAWINGS

FIG. 1 shows an exemplified flow diagram for making the asbestos containment composition.

DETAILED DESCRIPTION

Figure 2:
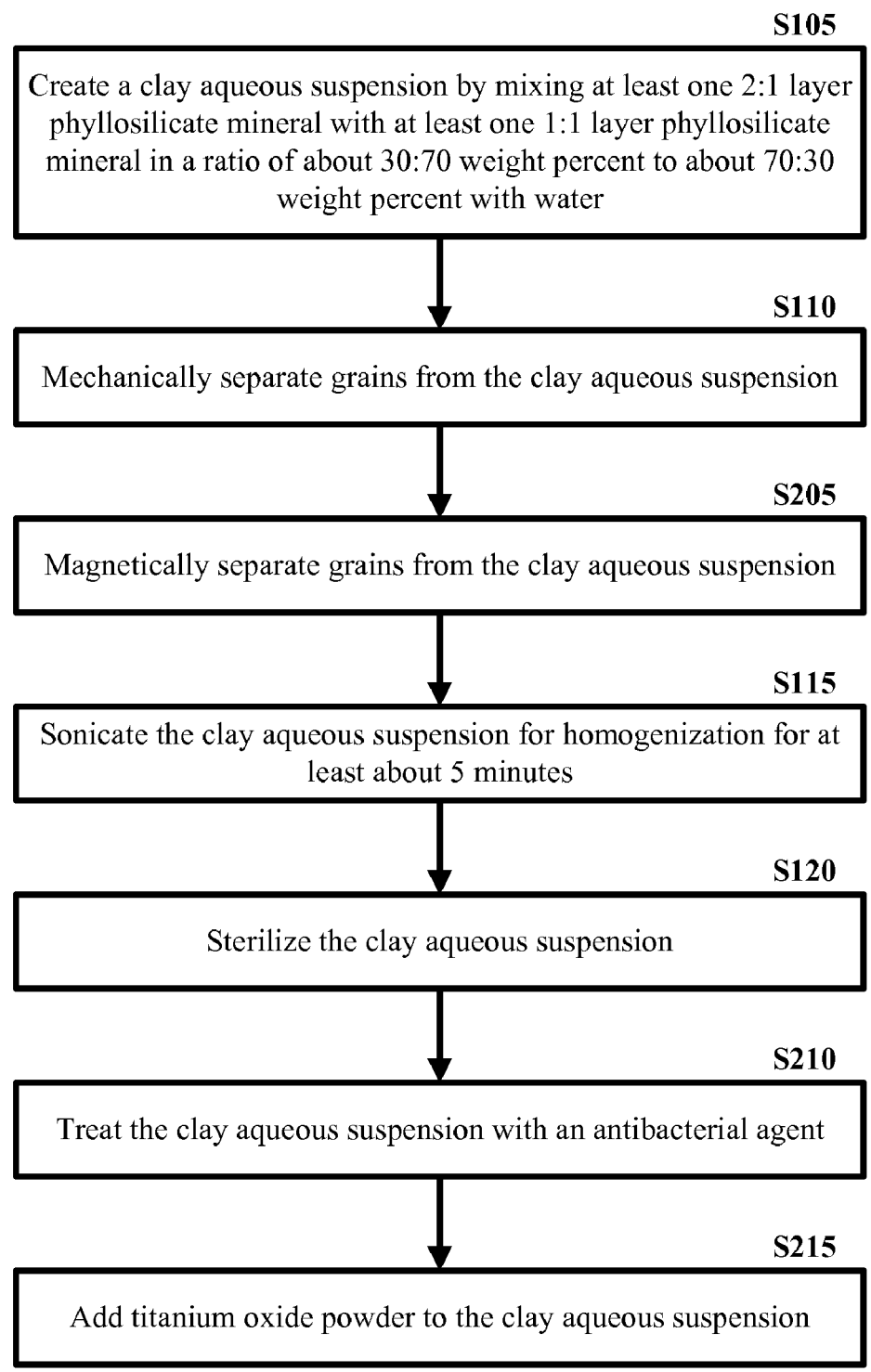
FIG. 2 shows another exemplified flow diagram for making the asbestos containment composition.

The present invention relates to an asbestos containment composition.

In one embodiment, the asbestos containment composition is a clay aqueous suspension comprising a mixture of at least one 2:1 layer phyllosilicate mineral, at least one 1:1 layer phyllosilicate mineral, and water. The 2:1 phyllosilicate mineral may be montmorillonite, whereas the 1:1 phyllosilicate mineral may be kaolinite. When these minerals are combined, they make up about 10% of the clay aqueous suspension. The other approximately 90% of the clay aqueous suspension is made up of water.

I. Introduction

Asbestos was first used in the 1900's but became widely implemented during the global economic expansion after World War II. This flexible and corrosion-resistant material is non-flammable and non-conductive. As a good insulator, asbestos has been used to insulate, fireproof and soundproof buildings.

Asbestos is a general term that describes a group of minerals that are fibrous in nature. Common fibrous minerals include, but are not limited to, chrysotile, amosite, and crocidolite. Of approximately 90% of the asbestos products in the United States involve chrysotile.

From approximately the late 1960's to the approximately mid 1970's, respiratory diseases linked to chrysotile asbestos were observed. However, by this time, about 840,000 schools and commercial buildings had asbestos containing materials. The Environmental Protection Agency (EPA) estimates that about 27 million Americans have been significantly exposed to asbestos. As a result, asbestos is major health problem that persists; it remains commonly encountered in building demolition, rehabilitation, and water pipe repairs.

Asbestos abatement is a large and well established industry. Current methods include soaking asbestos with water prior to removal and disposal. For instance, EPA guidelines include wetting the isolated asbestos with water followed by mechanical removal seal in the waste in containers. After this process, hepafilters and a negative air machine removes the remaining asbestos in the air.

However, this process is time consuming and inefficient due to secondary dispersal of fibers during removal. Although secondary fiber disposal uses special air filters and pumps, this process often takes weeks. Hence, if this process is performed in a large building or on multiple floors, it will be very costly and timely. Preventing secondary dispersal of fibers is key to providing asbestos abatement companies with a competitive edge. Moreover, there is currently no reliable method for dealing with asbestos that is released during building demolition, buildings partially destroyed by fire and/or accidental release of asbestos during building maintenance.

Consequently, what is needed is a new way of containing asbestos that minimizes exposure to individuals and the environment. Containment should be environmentally benign and allows for the sequestering of asbestos particles.

II. Asbestos Containment Composition

The present invention discloses an asbestos containment composition that sequesters, aggregates, and helps remove asbestos particles, dust particles, and similar fibrous matter more rapidly that what is currently available or known. As an advantage, such composition can cover or contain asbestos to lessen its chance of becoming airborne during accidental exposure or purposeful removal. Reducing airborne asbestos in air helps lower the risk of asbestos contact to individuals and also lowers environmental contamination to other areas of a building or surrounding properties.

Referring to FIGS. 1 and 2, the asbestos containment composition is a clay aqueous suspension that comprises inorganic and/or refined minerals mixed with water S105. One of these minerals is a 2:1 layer phyllosilicate mineral, such as montmorillonite or an equivalent mineral. Another mineral is a 1:1 layer phyllosilicate mineral, such as kaolinite or an equivalent mineral. When these minerals are mixed together, the weight percent can be any percentage from about 30:70 weight percent to about 70:30 weight percent. However, the total amount of minerals of the composition comprises approximately 10 weight percent. The other approximately 90 weight percent is water. Water may be any kind of water (e.g., distilled, tap, bottled, etc.) from any source (e.g., ground, percolating, stream, pond, lake, etc.).

Overall, the minerals that make up the asbestos containment composition are generally non-flammable materials that are generally regarded as safe for industrial use and even food products.

When selecting appropriate combinations of 2:1 layer phyllosilicate minerals and 1:1 layer phyllosilicate minerals, the better combinations result in the exploitation of the advantages each mineral has to offer. For instance, if montmorillonite and kaolinite are the selected minerals to be combined, the adhesive properties of montmorillonite can be exploited while kaolinite allows for mechanical strength, color, and the prevention of cracking when dried.

The weight percent of selected minerals are allowed to vary, depending on the type of environment to which the asbestos containment composition is applied. Having various kinds and amounts of phyllosilicate minerals allows the composition to exploit a range of properties of the 2:1 layer phyllosilicate mineral and the 1:1 layer phyllosilicate mineral, including platy particle morphologies, high surface area, hydrophilic properties and point of zero charge (PZC). For example, for use in a dry, high temperature environment (such as a desert), the composition should contain more of the 1:1 layer phyllosilicate minerals (e.g., kaolinite or equivalent mineral). As a result, the opportunities for the composition to expand and/or crack after being sprayed or applied on asbestos or other fibrous particles are likely to be minimized.

In an environment that is moisture-rich, the composition may demand more of the 2:1 layer phyllosilicate minerals (e.g., montmorillonite or equivalent mineral). Such minerals would prevent slaking and help retain ambient humidity, such as in areas with asbestos-lined pipes.

Montmorillonite is a 2:1 layer phyllosilicate mineral having an Al-rich dioctahedral sheet connected to two opposing Si-tetrahedral sheets. The 2:1 layers are connected by hydrated exchangeable cations, usually $Na^+$[2]. The crystal structure has a periodicity of approximately 14 Å under ambient atmospheric conditions. In aqueous solution, the structure can swell by incorporating water in the interlayer to approximately 140 Å. The mineral forms platy crystals, lamellar aggregates, and irregular crystals commonly ~2.0 to ~0.1 μm in diameter. The PZC is about 2-3[3].

Kaolinite is a 1:1 layer phyllosilicate mineral consisting of an Al-rich dioctahedral sheet connected to a Si-tetrahedral sheet [1]. The 1:1 layers are held together through hydrogen bonding and have a periodicity along the c-axis of ~7 Å. The PZC is about 3-4[3].

The PZC for asbestos materials (Mg silicates) is commonly ~9-~12 (pH). The PZC of the al-rich phyllosilicates tends to be about 2 to about 4. The difference in surface chemistry is believed to lead to a segregation of the minerals allowing the montmorillonite-kaolinite mixture to encapsulate the asbestos.

Other clay minerals may be substituted for montmorillonite and/or kaolinite when making the asbestos containment composition. For instance, smectite minerals, such as R0 illite-smectite, R1 illite-smectite and R2 illite-smectite, may be substituted for montmorillonite. Additionally, illite, R3 illite-smectite, muscovite, biotite, lepdiolite or margarite may be substituted for kaolinite. Furthermore, nontronite and beidellite may be substituted for montmorillonite. Whichever mineral substitute is used, the mineral substituents may be cation exchanged with the $Na^+$, $Ca^{2+}$, $K^+$ and/or $NH_4^+$ cations or cation complexes of the montmorillonite and/or kaolinite. It should be noted that the morphology and characteristics of each of these exemplified substitutes are well known in the art.

After mixing at least one 2:1 layer phyllosilicate minerals with at least one 1:1 layer phyllosilicate mineral with water, coarse grains may be mechanically separated from the combination S110. To achieve this filtering, sieves may be used. The aperture size of the sieves may range from about 38 μm to about 212 μm. The combination may be further refined by magnetically separating the grains S205. Magnetic separation may be achieved by using, for example, a flow-through separator.

After separation, the clay aqueous suspension may be sonicated to homogenize the mixture S115. It may take at least about 5 minutes for sonication to be completed. If less time is used, homogenization may not occur. Sonication may be achieved by using an ultrasonic bath or a probe (e.g., a cell disrupter).

Once the clay aqueous suspension is or is nearly homogenized, it may be sterilized S120. Sterilization may be achieved by either dry heating or boiling the clay aqueous suspension. A minimum temperature of 70° C. for about 20 minutes is recommended. While either process may not completely terminate bacterial growth, it is expected to reduce bacterial growth.

As a further embodiment, the clay aqueous suspension may be treated with an antibacterial agent S210. Nonlimiting examples include bleach and silver nitrate solution. The purpose of the antibacterial agent is to help maintain the shelf-life of the clay aqueous suspension and the sterile conditions.

Where bleach is added, about 1% to about 10% solution may be used in a concentration of about 0.1% to about 5.0% by volume of the clay aqueous suspension.

Where silver nitrate solution is added, silver nitrate solution may be one of the following: $AgNO_3$, $AgNO_3$ solution or $AgNO_3$ solution (aq). The solution of silver nitrate may be at a concentration of about 0.01M to about 0.1M. It may be mixed with the clay aqueous suspension at a ratio of about 0.01% to about 0.03% by volume.

As another embodiment, the maximum combined ratio of the antibacterial agents to the clay aqueous suspension is up to about 8% by volume.

For transmission electron microscopy investigation, grain mounts were prepared of the Na-montmorillonite using alcohol as a dispersing medium. Analyses were prepared on 300 mesh hole carbon Cu grids. Analyses were investigated using a 300 kV JEM 3010 transmission electron microscope (TEM).

TEM investigations indicate that the montmorillonite phase used in the process appears dominantly composed of montmorillonite particles (~>95%) and with a lesser amount of silica particles. The morphology of the montmorillonite particles are generally described based on the classification outlined in Güven [2]. The montmorillonite from the suspension and process may comprise commonly of foliated lamellar aggregates. Such aggregates may compose about 40% to about 75% of the montmorillonite particles. Subhedral platelets and compact subhedral lamellar aggregates may occur as well. Both may make up about 10% to about 40% of the montmorillonite particles. Subhedral lamellar aggregates may also occur. These may make up about 5% to about 10% of the montmorillonite particles.

Foliated lamellar aggregates may vary in diameter from ~0.2 to >5.0 μm. Subhedral lamellar aggregates may vary in diameter from ~0.1 to ~3.5 μm. Subhedral platelets may vary in diameter from ~0.5 to >5.0 μm.

EDS spectra may also be collected using the 300 kV JEM 3010 TEM. EDS spectra were collected using spot size 2-3. Spectra with Si peaks greater than 100 counts were deemed significant. Variation in intensity was related to apparent thickness. The higher contrast particles appeared to produce more intense spectra. Analyses were performed on the center of particles.

The elements observed include Si, Al, Fe, Ca, K, Na and Mg. Systematic drift in EDS analyses occurred. $SiO_2$ concentrations tend to be elevated and $Na_2O$ concentrations may be lower than actual concentrations, owing to diffusion in either the solid state or release of hydrated interlayer sodium cations. EDS chemical composition data (weight percent of oxides for each experimental run) for montmorillonite provided is in TABLE 1. The EDS summary data (e.g., average, maximum, minimum, and standard deviation) of the elements is presented in TABLE 2.

TABLE 1

EDS Data for Montmorillonite

| | 1 | 2 | 3 | 4 | 5 | 6 | 7 | 8 | 9 | 10 |
|---|---|---|---|---|---|---|---|---|---|---|
| $SiO_2$ | 61.44 | 56.72 | 66.32 | 77.43 | 55.37 | 56.32 | 68.92 | 61.86 | 57.58 | 58.72 |
| $Al_2O_3$ | 26.27 | 26.86 | 22.72 | 15.28 | 29.48 | 29.44 | 21.59 | 24.35 | 27.48 | 27.61 |
| $Fe_2O_3$ | 3.16 | 5.66 | 3.18 | 2.50 | 2.64 | 3.04 | 3.70 | 1.33 | 3.56 | 3.08 |
| MgO | 5.22 | 6.23 | 4.06 | 2.47 | 7.70 | 6.53 | 0.95 | 5.98 | 7.28 | 6.81 |
| CaO | 1.26 | 1.46 | 1.65 | 0.98 | 1.60 | 1.34 | 2.03 | 1.58 | 1.49 | 1.59 |
| $Na_2O$ | 2.64 | 2.98 | 2.07 | 1.33 | 3.11 | 3.30 | 2.82 | 4.68 | 2.61 | 2.18 |
| $K_2O$ | 0.00 | 0.09 | 0.01 | 0.01 | 0.10 | 0.03 | 0.00 | 0.21 | 0.00 | 0.00 |
| Total | 99.99 | 100.00 | 100.01 | 100.00 | 100.00 | 100.00 | 100.01 | 99.99 | 100.00 | 99.99 |
| | 11 | 12 | 13 | 14 | 15 | 16 | 17 | 18 | 19 | 20 |
| $SiO_2$ | 56.12 | 58.30 | 58.38 | 59.83 | 66.51 | 62.01 | 58.77 | 60.52 | 60.61 | 59.54 |
| $Al_2O_3$ | 29.83 | 29.22 | 29.04 | 26.91 | 23.06 | 26.60 | 27.30 | 26.85 | 27.85 | 27.63 |
| $Fe_2O_3$ | 3.14 | 2.35 | 3.09 | 2.99 | 3.00 | 2.69 | 2.20 | 2.29 | 2.21 | 2.55 |
| MgO | 7.05 | 6.25 | 5.93 | 5.61 | 4.00 | 5.50 | 7.56 | 6.34 | 5.50 | 5.82 |
| CaO | 1.38 | 1.54 | 1.71 | 1.08 | 1.27 | 0.95 | 1.01 | 1.08 | 1.04 | 0.93 |
| $Na_2O$ | 2.44 | 2.17 | 1.68 | 3.47 | 1.97 | 2.15 | 3.15 | 2.96 | 2.74 | 3.53 |
| $K_2O$ | 0.05 | 0.16 | 0.17 | 0.11 | 0.20 | 0.10 | 0.01 | 0.00 | 0.06 | 0.00 |
| Total | 100.01 | 99.99 | 100.00 | 100.00 | 100.01 | 100.00 | 100.00 | 100.04 | 100.01 | 100.00 |
| | 21 | 22 | 23 | 24 | 25 | 26 | 27 | 28 | 29 | 30 |
| $SiO_2$ | 59.22 | 59.33 | 63.98 | 58.32 | 59.53 | 59.90 | 60.98 | 58.83 | 67.99 | 63.92 |
| $Al_2O_3$ | 27.48 | 26.90 | 26.02 | 28.33 | 28.73 | 28.54 | 28.36 | 28.47 | 21.92 | 25.06 |
| $Fe_2O_3$ | 2.65 | 2.75 | 2.91 | 2.68 | 2.85 | 2.87 | 2.94 | 2.79 | 1.74 | 3.29 |
| MgO | 5.75 | 6.23 | 4.00 | 6.21 | 4.67 | 5.22 | 4.14 | 5.67 | 4.51 | 4.33 |
| CaO | 1.06 | 0.85 | 1.06 | 1.17 | 1.16 | 1.03 | 1.13 | 1.17 | 0.68 | 1.43 |
| $Na_2O$ | 3.76 | 3.89 | 2.00 | 3.30 | 3.04 | 2.40 | 2.41 | 3.01 | 3.10 | 1.92 |
| $K_2O$ | 0.09 | 0.05 | 0.04 | 0.00 | 0.02 | 0.04 | 0.04 | 0.05 | 0.07 | 0.05 |
| Total | 100.01 | 100.00 | 100.01 | 100.01 | 100.00 | 100.00 | 100.00 | 99.99 | 100.01 | 100.00 |
| | 31 | 32 | 33 | 34 | 35 | 36 | 37 | 38 | 39 | 40 |
| $SiO_2$ | 58.32 | 68.96 | 60.12 | 60.17 | 62.20 | 64.36 | 65.36 | 64.77 | 58.77 | 57.48 |
| $Al_2O_3$ | 28.75 | 23.65 | 28.51 | 26.80 | 26.86 | 25.30 | 24.86 | 25.24 | 27.92 | 28.46 |
| $Fe_2O_3$ | 2.62 | 3.33 | 2.32 | 2.12 | 2.62 | 2.76 | 2.73 | 2.78 | 2.74 | 2.72 |
| MgO | 5.58 | 0.71 | 5.03 | 6.96 | 5.16 | 4.35 | 2.99 | 4.12 | 5.74 | 6.59 |
| CaO | 1.15 | 1.11 | 1.27 | 1.03 | 1.11 | 1.39 | 1.06 | 1.14 | 1.15 | 1.25 |
| $Na_2O$ | 3.51 | 2.23 | 2.74 | 2.87 | 2.00 | 1.76 | 2.88 | 1.90 | 3.51 | 3.42 |
| $K_2O$ | 0.07 | 0.00 | 0.01 | 0.04 | 0.05 | 0.09 | 0.13 | 0.05 | 0.17 | 0.07 |
| Total | 100.00 | 99.99 | 100.00 | 99.99 | 100.00 | 100.01 | 100.01 | 100.00 | 100.00 | 99.99 |
| | 41 | 42 | 43 | 44 | 45 | 46 | 47 | 48 | 49 | 50 |
| $SiO_2$ | 64.14 | 58.91 | 61.51 | 63.40 | 63.49 | 61.01 | 60.48 | 58.65 | 62.02 | 57.04 |
| $Al_2O_3$ | 25.04 | 28.56 | 28.28 | 26.20 | 26.55 | 28.14 | 28.27 | 28.32 | 25.38 | 28.06 |
| $Fe_2O_3$ | 3.17 | 3.02 | 2.87 | 3.11 | 3.14 | 2.95 | 3.06 | 3.40 | 3.29 | 3.26 |
| MgO | 4.18 | 5.45 | 3.98 | 3.88 | 3.66 | 4.56 | 4.31 | 5.73 | 5.21 | 7.11 |
| CaO | 1.34 | 1.06 | 1.15 | 1.20 | 1.22 | 1.06 | 1.00 | 1.31 | 1.28 | 1.18 |
| $Na_2O$ | 2.08 | 2.95 | 2.17 | 2.20 | 1.85 | 2.22 | 2.78 | 2.57 | 2.16 | 3.32 |
| $K_2O$ | 0.05 | 0.05 | 0.05 | 0.00 | 0.09 | 0.06 | 0.10 | 0.03 | 0.04 | 0.04 |
| Total | 100.00 | 100.00 | 100.01 | 99.99 | 100.00 | 100.00 | 100.00 | 100.01 | 99.38 | 100.01 |
| | 51 | 52 | 53 | 54 | 55 | 56 | 57 | 58 | 59 | 60 |
| $SiO_2$ | 61.39 | 60.33 | 61.17 | 65.13 | 59.18 | 60.10 | 59.09 | 61.20 | 63.28 | 60.19 |
| $Al_2O_3$ | 25.49 | 26.79 | 25.91 | 23.06 | 27.72 | 27.09 | 27.71 | 26.28 | 24.26 | 26.86 |
| $Fe_2O_3$ | 4.21 | 2.50 | 4.04 | 3.09 | 2.78 | 2.70 | 2.94 | 3.14 | 2.99 | 2.54 |
| MgO | 4.92 | 6.47 | 5.08 | 5.58 | 5.95 | 6.26 | 6.22 | 6.20 | 5.09 | 5.92 |
| CaO | 1.25 | 1.05 | 1.51 | 0.75 | 1.17 | 1.05 | 1.07 | 1.00 | 1.18 | 1.01 |

TABLE 1-continued

EDS Data for Montmorillonite

| | | | | | | | | | | |
|---|---|---|---|---|---|---|---|---|---|---|
| Na$_2$O | 2.75 | 2.84 | 2.16 | 2.39 | 3.18 | 2.75 | 2.96 | 2.18 | 3.19 | 3.43 |
| K$_2$O | 0.00 | 0.02 | 0.13 | 0.00 | 0.02 | 0.05 | 0.00 | 0.00 | 0.00 | 0.05 |
| Total | 100.01 | 100.00 | 100.00 | 100.00 | 100.00 | 100.00 | 99.99 | 100.00 | 99.99 | 100.00 |
| | 61 | 62 | 63 | 64 | 65 | 66 | 67 | 68 | 69 | 70 |
| SiO$_2$ | 60.01 | 59.21 | 62.33 | 62.28 | 62.98 | 62.19 | 60.75 | 62.25 | 65.58 | 56.69 |
| Al$_2$O$_3$ | 27.63 | 27.71 | 25.17 | 25.63 | 21.30 | 23.42 | 25.43 | 24.02 | 21.55 | 26.95 |
| Fe$_2$O$_3$ | 2.78 | 2.46 | 2.87 | 2.90 | 6.52 | 5.98 | 5.09 | 5.40 | 6.78 | 5.66 |
| MgO | 5.56 | 6.49 | 5.91 | 5.54 | 4.83 | 5.53 | 4.97 | 6.37 | 2.98 | 6.16 |
| CaO | 1.16 | 1.11 | 1.16 | 1.14 | 1.57 | 1.23 | 1.37 | 1.25 | 1.48 | 1.52 |
| Na$_2$O | 2.84 | 3.03 | 2.56 | 2.48 | 2.79 | 1.66 | 2.26 | 0.70 | 1.60 | 3.02 |
| K$_2$O | 0.03 | 0.00 | 0.00 | 0.02 | 0.00 | 0.00 | 0.12 | 0.00 | 0.03 | 0.00 |
| Total | 100.01 | 100.01 | 100.00 | 99.99 | 99.99 | 100.01 | 99.99 | 99.99 | 100.00 | 100.00 |
| | 71 | 72 | 73 | 74 | 75 | 76 | 77 | 78 | 79 | 80 |
| SiO$_2$ | 55.87 | 65.62 | 58.36 | 58.10 | 57.40 | 59.69 | 57.64 | 60.06 | 59.32 | 62.93 |
| Al$_2$O$_3$ | 27.04 | 20.34 | 25.70 | 26.49 | 26.29 | 25.47 | 26.77 | 25.81 | 25.92 | 23.38 |
| Fe$_2$O$_3$ | 5.86 | 5.94 | 5.06 | 4.70 | 4.42 | 4.55 | 4.50 | 5.19 | 4.56 | 4.93 |
| MgO | 6.28 | 4.75 | 6.84 | 6.11 | 7.62 | 5.76 | 6.47 | 5.45 | 6.30 | 4.85 |
| CaO | 1.21 | 1.62 | 1.69 | 1.50 | 1.52 | 1.76 | 1.71 | 1.65 | 1.75 | 1.94 |
| Na$_2$O | 3.68 | 1.43 | 2.27 | 3.03 | 2.68 | 2.64 | 2.87 | 1.76 | 2.14 | 1.96 |
| K$_2$O | 0.06 | 0.30 | 0.08 | 0.07 | 0.07 | 0.13 | 0.04 | 0.08 | 0.02 | 0.01 |
| Total | 100.00 | 100.00 | 100.00 | 100.00 | 100.00 | 100.00 | 100.00 | 100.00 | 100.01 | 100.00 |

TABLE 2

EDS Summary for Montmorillonite

| | SiO$_2$ | Al$_2$O$_3$ | Fe$_2$O$_3$ | MgO | CaO | Na$_2$O | K$_2$O |
|---|---|---|---|---|---|---|---|
| Average | 61.06 | 26.22 | 3.39 | 5.39 | 1.27 | 2.61 | 0.05 |
| Maximum | 77.43 | 29.83 | 6.78 | 7.7 | 2.03 | 4.68 | 0.3 |
| Minimum | 55.37 | 15.28 | 1.33 | 0.71 | 0.68 | 0.7 | 0 |
| St. Dev. | 3.53 | 2.43 | 1.15 | 1.31 | 0.27 | 0.66 | 0.06 |

Figure 3:
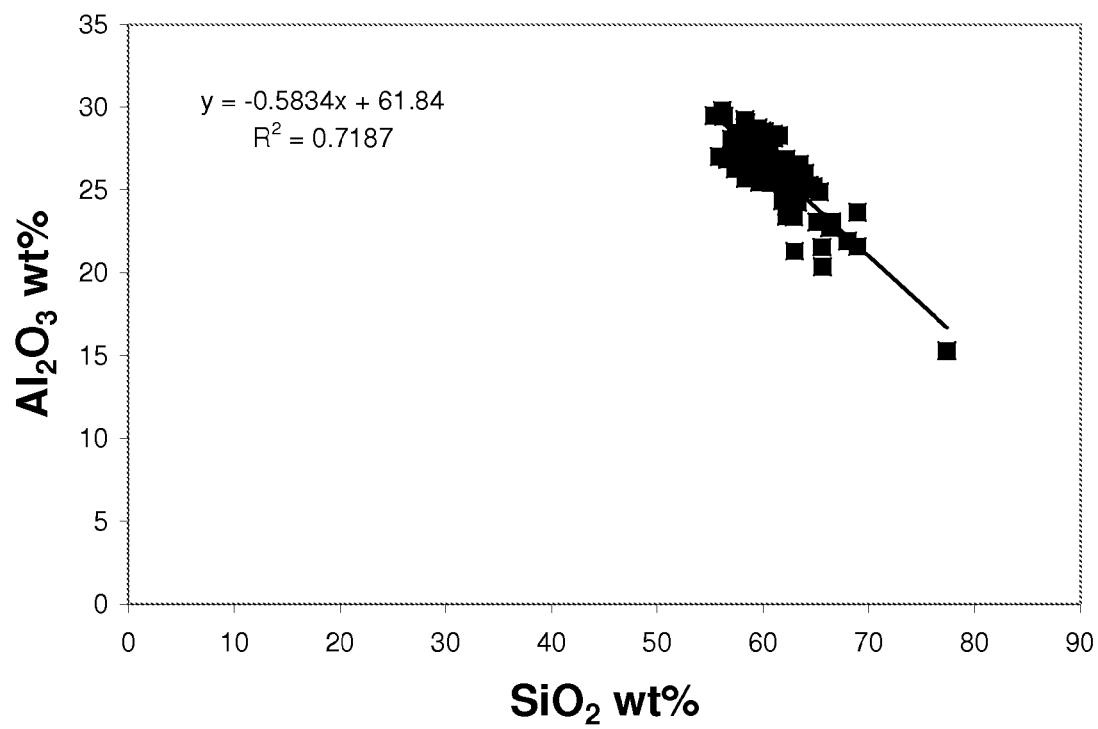
FIG. 3 shows an exemplified X-Y plot of $SiO_2$ and $Al_2O_3$ concentrations in weight percentage for montmorillonite particles.
Figure 4:
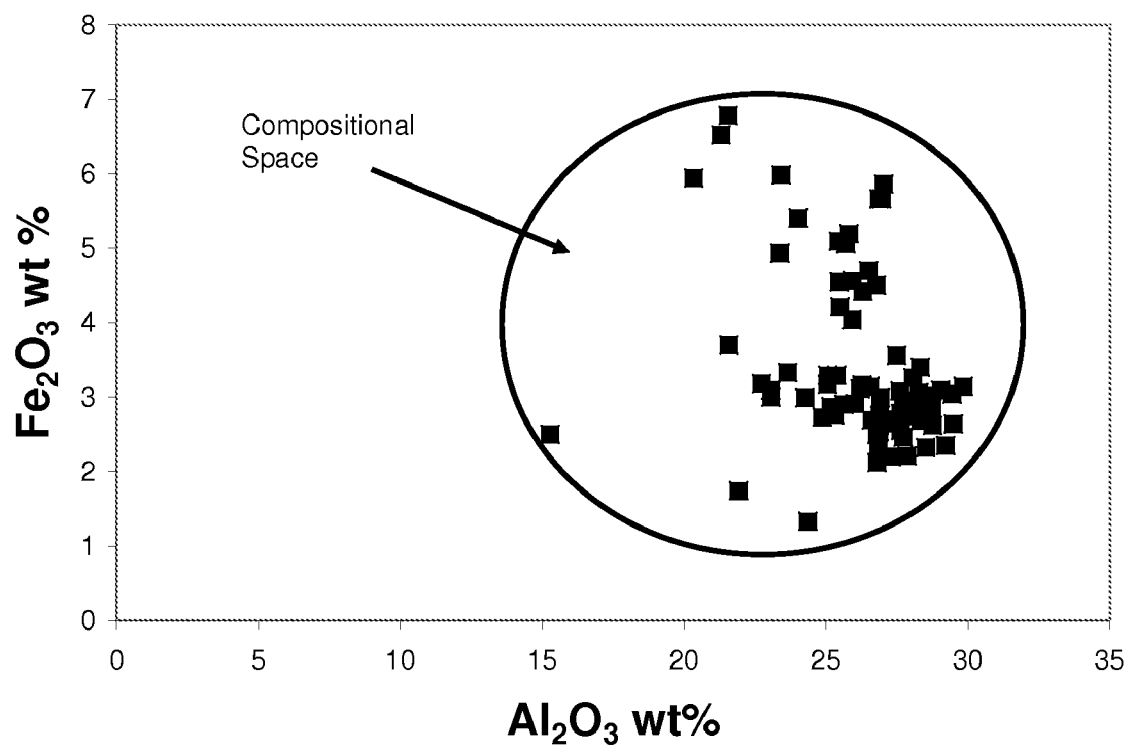
FIG. 4 shows an exemplified X-Y plot of $Fe_2O_3$ and $Al_2O_3$ concentrations in weight percentage for montmorillonite particles.
Figure 5:
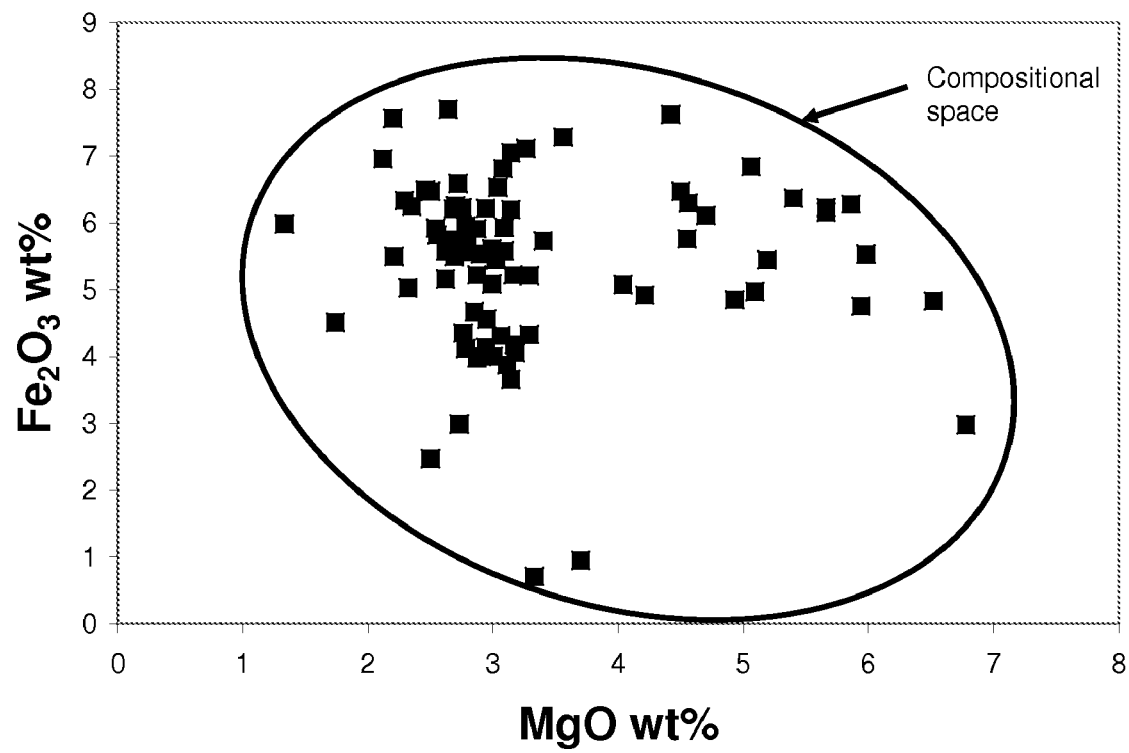
FIG. 5 shows an exemplified X-Y plot of $Fe_2O_3$ and MgO concentrations in weight percentage for montmorillonite particles.

Various X-Y plots of concentrations of EDS analyses in montmorillonite particles can be seen as depicted in FIGS. 1-3. FIG. 3 shows the correlation and compositional trend of SiO$_2$ and Al$_2$O$_3$ concentrations in weight percentage. FIG. 4 shows the correlation and compositional trend of Fe$_2$O$_3$ and Al$_2$O$_3$ concentrations in weight percentage. FIG. 5 shows the correlation and compositional trend of Fe$_2$O$_3$ and MgO concentrations in weight percentage.

Similarly, EDS chemical composition data (weight percent of oxides for each experimental run) for kaolinite is provided in TABLE 3. The EDS summary data (e.g., average, maximum, minimum, and standard deviation) of the elements is presented in TABLE 4.

TABLE 3

EDS Data of Non-pure End Member Kaolinites

| Kaolinite | 1 | 2 | 3 | 4 | 5 | 6 | 7 | 8 |
|---|---|---|---|---|---|---|---|---|
| SiO$_2$ | 54.51 | 55.54 | 55.43 | 54.51 | 53.42 | 54.52 | 54.12 | 51.78 |
| TiO$_2$ | 0.00 | 0.00 | 0.00 | 0.00 | 0.00 | 0.00 | 0.00 | 0.00 |
| Al$_2$O$_3$ | 42.34 | 39.07 | 39.79 | 42.34 | 42.78 | 42.87 | 41.98 | 42.47 |
| Fe$_2$O$_3$ | 1.73 | 3.53 | 3.29 | 1.73 | 2.46 | 1.34 | 2.22 | 4.68 |
| MgO | 0.83 | 1.11 | 0.91 | 0.83 | 0.76 | 0.81 | 0.98 | 0.85 |
| CaO | 0.44 | 0.66 | 0.47 | 0.44 | 0.54 | 0.38 | 0.49 | 0.06 |
| K$_2$O | 0.15 | 0.09 | 0.11 | 0.15 | 0.04 | 0.08 | 0.21 | 0.16 |
| Total | 100.00 | 100.00 | 100.00 | 100.00 | 100.00 | 100.00 | 100.00 | 100.00 |

TABLE 4

EDS Summary of Non-pure End Member Kaolinites

| | SiO$_2$ | Al$_2$O$_3$ | Fe$_2$O$_3$ | MgO | CaO | K$_2$O |
|---|---|---|---|---|---|---|
| Average | 54.23 | 41.71 | 2.62 | 0.89 | 0.44 | 0.12 |
| Maximum | 55.54 | 42.87 | 4.68 | 1.11 | 0.66 | 0.21 |
| Minimum | 51.78 | 39.07 | 1.34 | 0.76 | 0.06 | 0.04 |
| St. Dev. | 1.20 | 1.44 | 1.13 | 0.11 | 0.17 | 0.05 |

The chemical composition of kaolinite may be the pure end member being defined by only $Al_2O_3$, $SiO_2$ and $H_2O$ components. However, EDS analyses of representative kaolinites indicate that substantial impurities or substitutions, including Fe, Mg, Ca, and K may occur.

Figure 6:
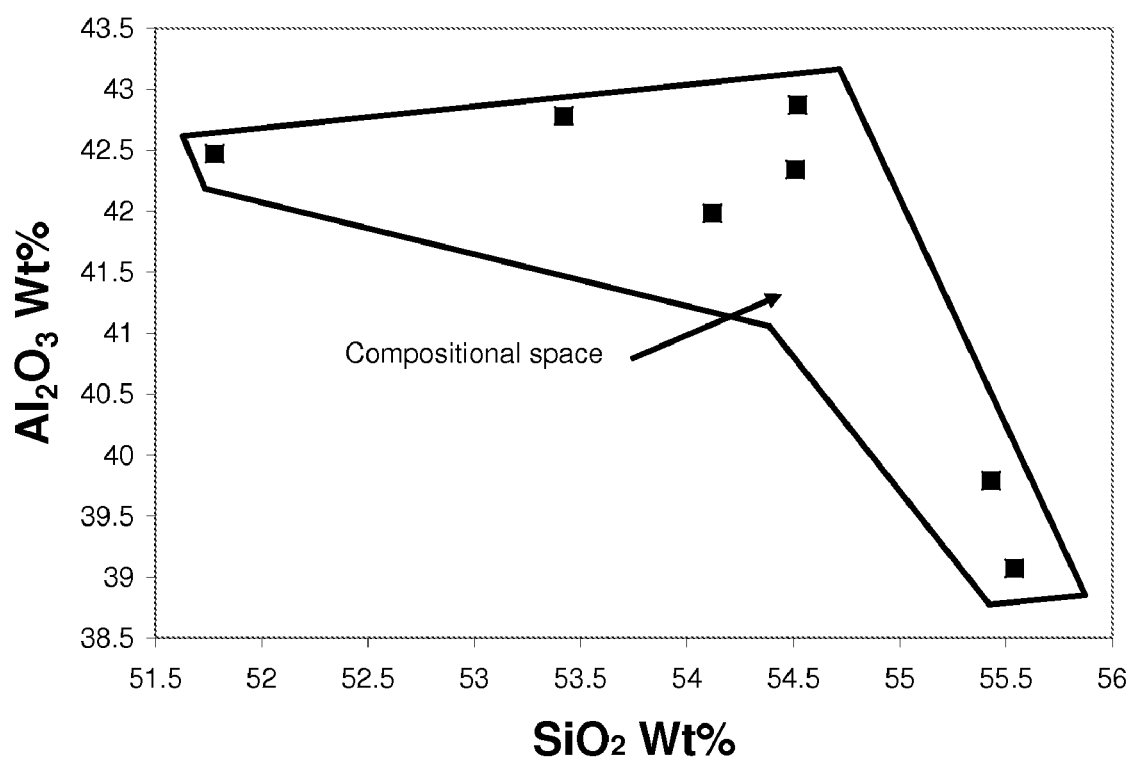
FIG. 6 shows an exemplified X-Y plot of $Al_2O_3$ and $SiO_2$ concentrations in weight percentage for non-pure end member kaolinites with compositional space delineated.
Figure 7:
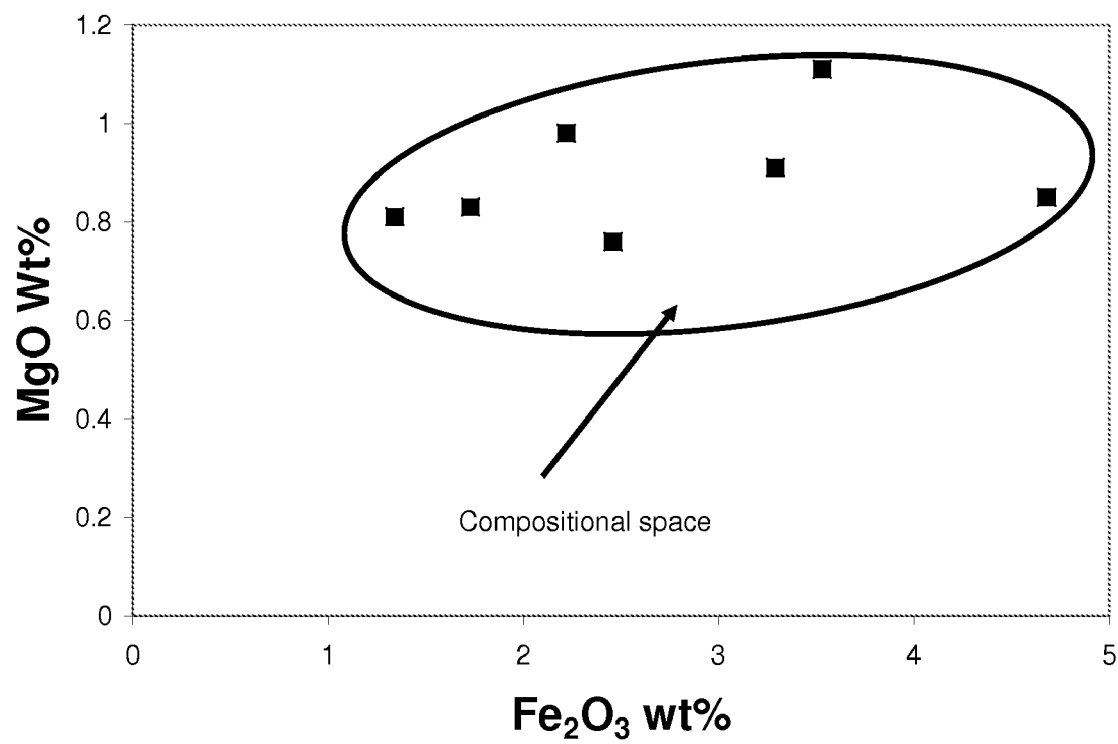
FIG. 7 shows an exemplified X-Y plot of $Fe_2O_3$ and MgO concentrations in weight percentage for non-pure end member kaolinites with compositional space delineated.

An X-Y plot of concentrations of $Al_2O_3$ and $SiO_2$ for non-pure end member kaolinites with compositional space delineated may be illustrated as in FIG. 6. Likewise, an X-Y plot of concentrations of $Fe_2O_3$ and MgO for non-pure end member kaolinites with compositional space delineated may be illustrated as in FIG. 7.

Figure 8:
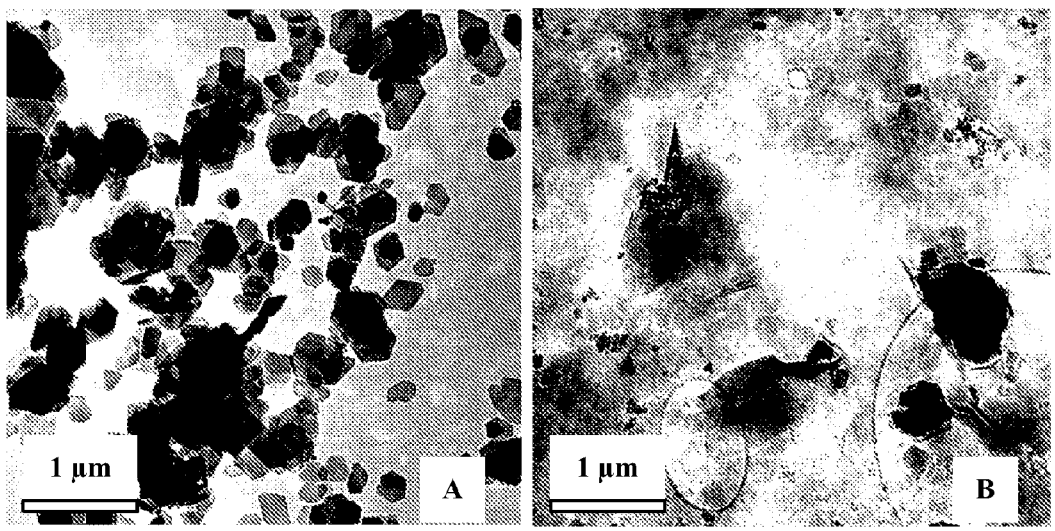
FIG. 8 shows TEM images of particles of the end member components of kaolinite and montmorillonite.

FIG. 8 shows TEM images of end member components of kaolinite and montmorillonite. Part A) shows a TEM image of platy kaolinite crystals. These crystals are euhedral to subhedral and vary in diameter from ~0.2 μm to ~2 μm. The flat platy nature of the crystals imparts mechanical strength when dried and prevent desiccation cracks from forming under ambient atmospheric conditions. Part B) shows a TEM image of aggregates of montmorillonite particles showing irregular aggregates of ~0.1 μm in diameter, which comprise the majority of the image, as well as lamellar aggregates, which are ~0.5 to ~1.5 μm in diameter. The irregular shape and small particle size make the particles absorb water; both contribute to the adhesive and rheological properties.

Figure 9:
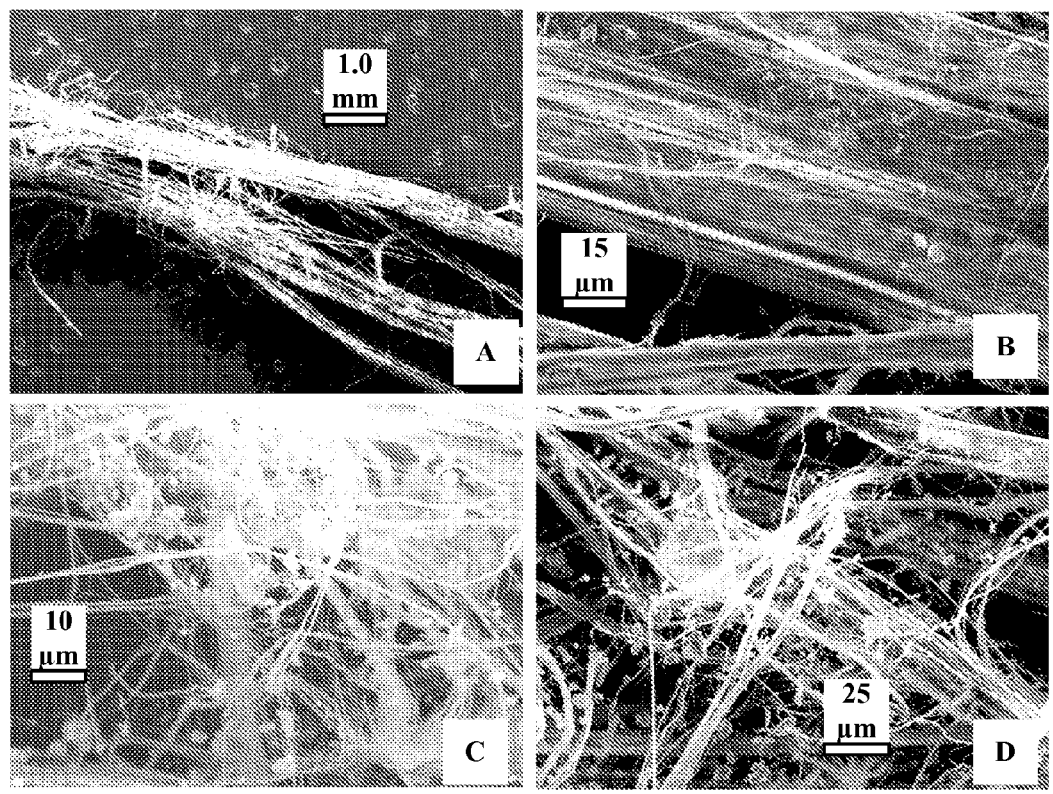
FIG. 9 shows images of an experiment using chrysotile fibers.

In an experiment, with chrysotile fibers, results may be seen in FIG. 9. Here, in Part A), a bundle of fibers is approximately 1 cm long and about 1.75 to about 2.00 mm wide. The fibers are partially cohesive and aligned in a parallel fashion typical of this form of asbestos. The randomly oriented fibers occur as a function of disruption and account for approximately 5% of the sample material.

In Part B) of FIG. 9, the image shows a higher magnification of the sample material that shows a smooth surface texture on a flat and cohesive region of the bundle. There is one large fiber that is broken off. The small fibers hanging off are approximately 0.5 μm in width.

In Part C) of FIG. 9, the figure dominantly shows anatomizing fine fibers that are approximately 0.01 to approximately 0.1 μm in width. The crystals were found to be largely quartz and ~1.0 to ~4.0 μm wide.

In Part D) of FIG. 9, the figure shows randomly oriented fibers approximately 3-5 μm in width with a few bundles that are approximately 20 μm wide. One large fiber of about 20 μm in width is present. The fibers are approximately 1 cm long. The abundance of the quartz crystals is about 5% of the sample.

Figure 10:
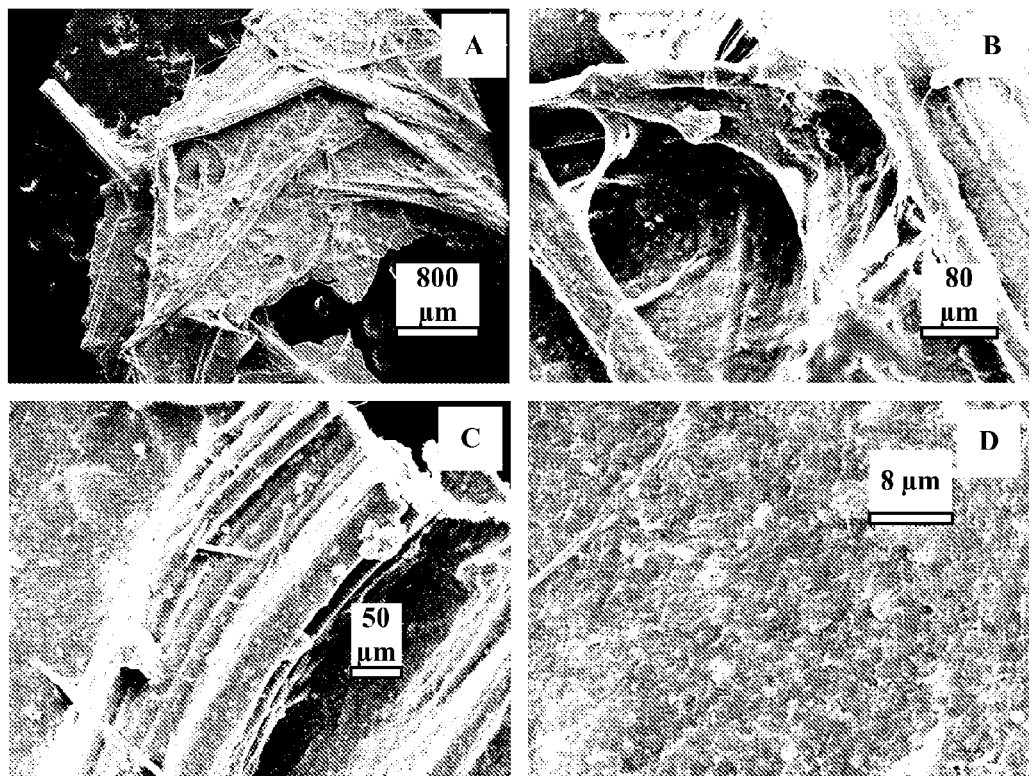
FIG. 10 shows an air dried example of chrysotile fibers.

FIG. 10 shows an air dried example of chrysotile fibers covered in an aqueous mixture of approximately 91% water and 9% solids with solids being a 1:1 mixture of montmorillonite and kaolinite. Part A) displays an SEM image of a fragment of test material with broken edges showing a hummocky texture of bundles of fibers that are approximately 30 to approximately 300 μm in width and approximately 2 mm in length. Bundles are randomly oriented. Small fibers are not visible owing to encapsulation by the mixture. All chrysotile is coated with a fine clay covering and fixed together. Part B) illustrates a higher magnification SEM image showing overlapping bundles of fibers approximately 60 μm in width. All features are coated with montmorillonite and kaolinite particles. Part C) shows a curvilinear bundle of chrysotile fibers that are approximately 200 μm in length. All chrysotile is coated with montmorillonite and kaolinite particles in a uniformed coating of clay. Some irregular clay aggregates are approximately 50 μm in width. Part D) shows one fiber bundle is present in the surface that is approximately 1 μm wide and approximately 20+ μm in length. The fiber has a kaolinite and smectite coating and is embedded in the montmorillonite-kaolinite matrix. The matrix consists of particles and is approximately 1 to 5 μm in width. Although visible the fiber is sequestered. Such fibers were extremely rare and indicate that the technology is about ≧99.999% effective.

Figure 11:
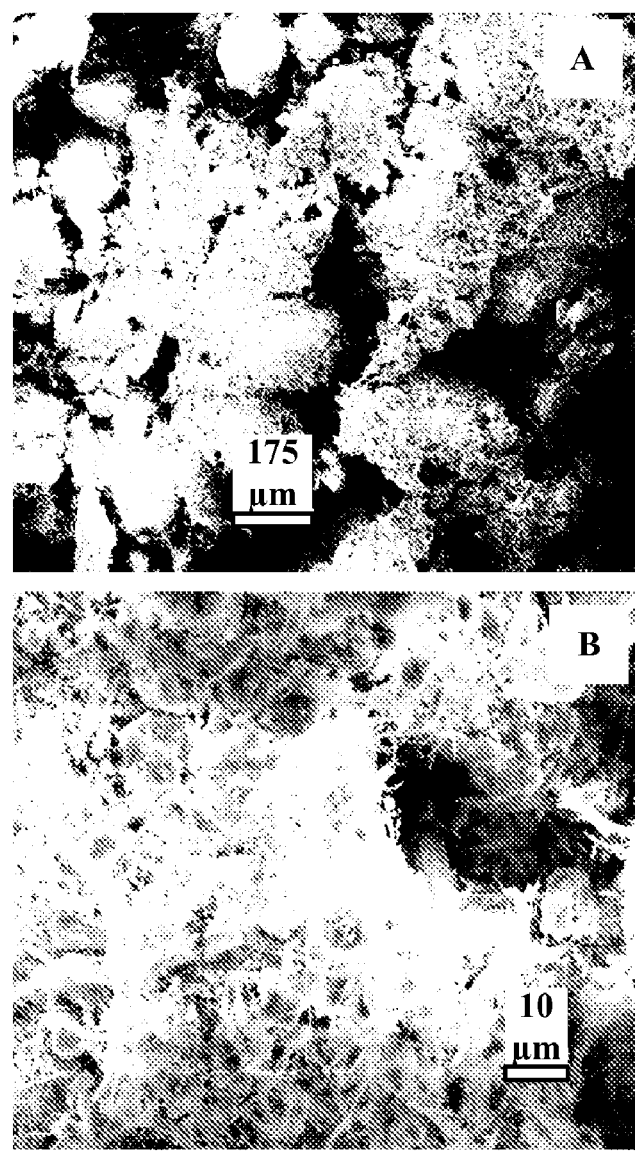
FIG. 11 shows an example of overall SEM images of milled chrysotile powder used in experiments.

FIG. 11 shows overall SEM images of milled chrysotile powder used in experiments. The SEM image in Part A) shows ball-like aggregates of complex mixtures of chrysotile fibers that are approximately 50-500 micrometers in width. Small chrysotile fibers are projecting in random orientations off of aggregates. Part B) shows a higher magnification image of an aggregate showing the fine detail of fibers on the surface of aggregates. Commonly fibers are several tens to a few micrometers in length and are approximately 3 to approximately 0.3 micrometers in width.

Figure 12:
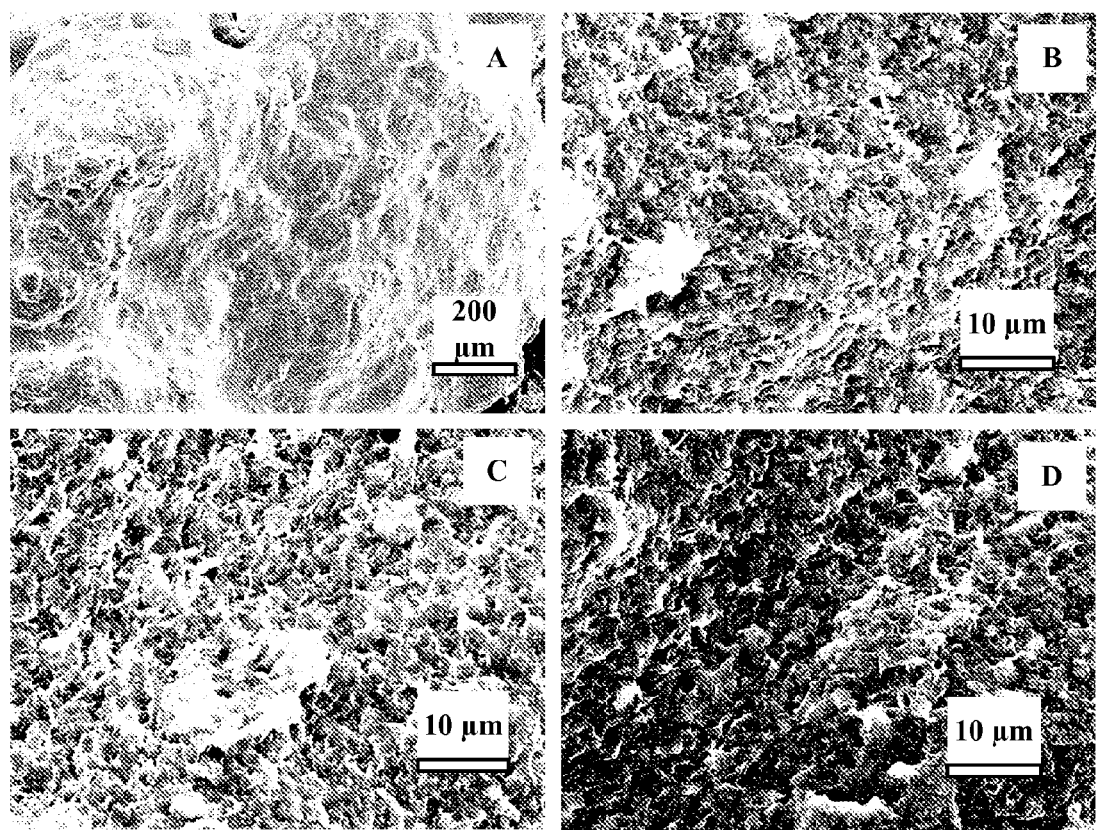
FIG. 12 shows an example of chrysotile powder covered in clay coating that has been air-dried.

FIG. 12 shows chrysotile powder covered in clay coating that has been air-dried. All samples show a hummocky texture. Part A) portrays an SEM image of evenly distributed dry mineral coating on a chrysotile powder showing an absence of fibers and also desiccation cracks. Parts B), C), and D) depict high magnification SEM images showing details of the surface. No fibers occur. Montmorillonite particles are shown with irregular edges. Kaolinite particles are more equant shaped. No desiccation cracks are observed. No fibers or fiber aggregates are observed.

A major problem is determining if asbestos is truly wet or fully penetrated with fluid. Resolving this problem, the composition includes a color for recognition regarding the areas where the composition has been applied.

As another embodiment and solution to the problem, titanium oxide powder may be added to the clay aqueous suspension S215. Titanium oxide may be in the form of anatase, brookite, or rutile. A preferred form is anatase nano particles that can vary in diameter from approximately 1 nm to approximately 500 nm in diameter. Crystals may be euhedral to anhedral in morphology. Titanium oxide particles may exist as single crystals, as aggregates of many crystals, or as twins.

Figure 13:
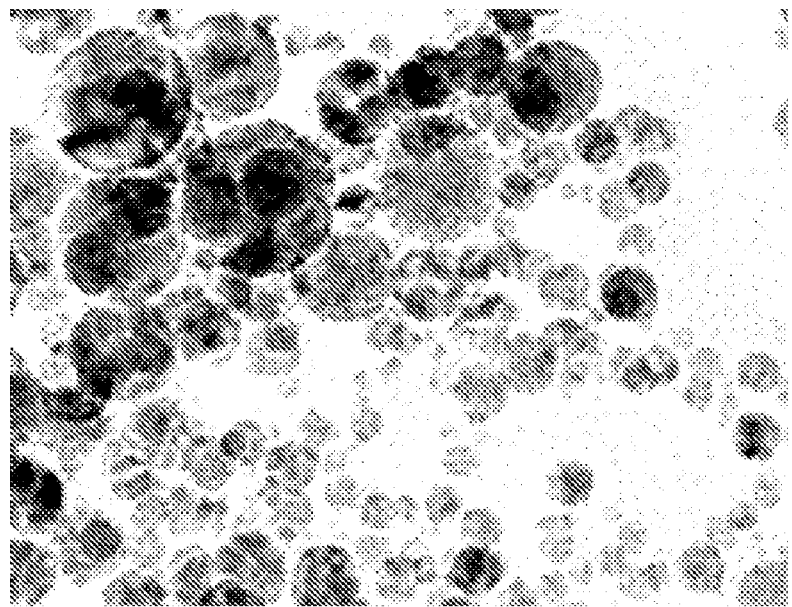
FIG. 13 shows an example of a TEM image of synthetic nanoparticles of titanium oxides having an average size of approximately 10 nm.

Illustrating these crystals, FIG. 13 shows an example of a TEM image of synthetic nanoparticles of titanium oxides with an average size of about 10 nm. This example shows anhedral and/or well-rounded particles.

Figure 14:
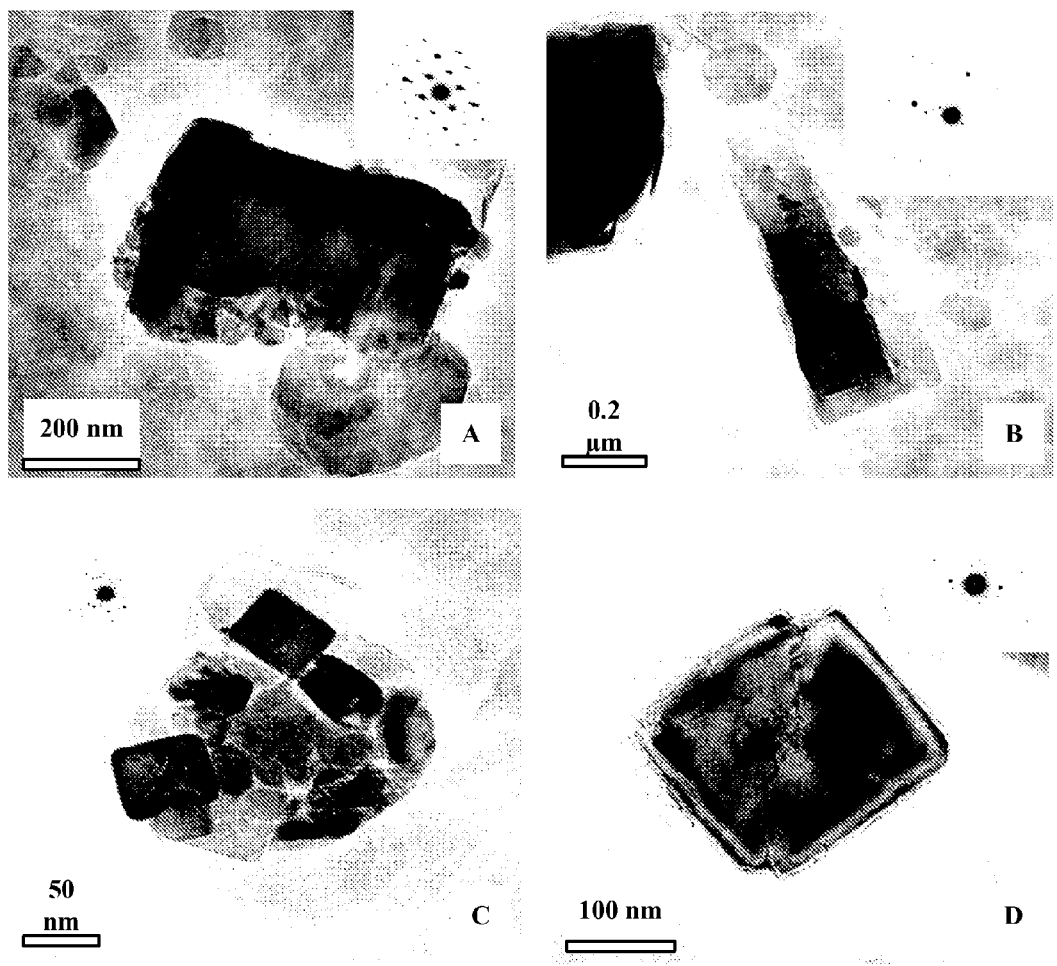
FIG. 14 shows an example of TEM images of euhedral titanium oxide particles from a natural source.

Similarly, FIG. 14 shows exemplified TEM images of euhedral titanium oxide particles from a natural source. The selected area electron diffraction data (insets) indicated particles are crystalline. Parts A and B of FIG. 14 show titanium oxide particles as individual crystals. Part C of FIG. 14 shows how titanium oxide particles can be seen as aggregates. Part D of FIG. 14 shows how titanium oxide particles may be twinned.

Titanium oxides are known to be luminescence under ultraviolet (UV) light. Hence, when the asbestos containment composition is applied to asbestos, dust, or other fibrous particles, UV light may be shined on the covered/applied areas to see what can be swept or removed or to determine areas not sufficiently covered on white backgrounds.

The composition follows "green" technology guidelines. By not using harmful organic chemicals and by requiring very minor energy input, the composition may be efficiently manufactured by hand. It can be easily manufactured globally with source materials being readily available.

This invention may be used to provide large scale containment and cleanup. The composition can be easily sprayed onto asbestos, allowing the composition to stick to the asbestos surface, effectively covering the needles. From there, cleanup can be a straightforward removal process. As shown in the figures, the clay mixture sequesters the asbestos so fragments or fibers are not dispersed during abatement.

This invention may also be used in large scale demolition or dust events, such as the collapse of buildings. The material can be sprayed over demolished buildings or structures to reduce dust, and to prevent or reduce human health impacts and/or environmental contamination.

In one embodied use, the composition can be sprayed on any asbestos containing surface. It is expected that the composition adheres to the material.

In another embodied use, after a building fire, the composition can be sprayed on surfaces to prevent dispersal of asbestos in the environment.

In another embodied use, for buildings being demolished, the composition can be dispersed concomitant with demolition and removal.

In another embodied use, for small scale releases, such as an unintentional rupture of insulation lining on a water pipe or ductwork, the composition can be applied. After application, asbestos removal technicians can be contacted. Such an application can significantly reduce the area of contamination and save on remediation expenses.

III. REFERENCES

[1] R. F. Giese, Jr., *Kaolin Minerals: Structure and Stability*, in 19 HYDROUS PHYLLOSILICATES. REVS. IN MINERALOGY 29-62 (S. W. Bailey ed., 1988).

[2] N. Güven, Smectites, in 19 HYDROUS PHYLLOSILICATES. REVS. IN MINERALOGY 495-559 (S. W. Bailey ed., 1988).

[3] D. LANGMUIR , AQUEOUS ENVIRONMENTAL CHEMISTRY (Prentice Hall 1997).

In this specification, "a" and "an" and similar phrases are to be interpreted as "at least one" and "one or more."

The foregoing descriptions of the embodiments of the claimed invention have been presented for purposes of illustration and description. They are not intended to be exhaustive or be limiting to the precise forms disclosed, and obviously many modifications and variations are possible in light of the above teaching. The illustrated embodiments were chosen and described in order to best explain the principles of the claimed invention and its practical application to thereby enable others skilled in the art to best utilize it in various embodiments and with various modifications as are suited to the particular use contemplated without departing from the spirit and scope of the claimed invention. In fact, after reading the above description, it will be apparent to one skilled in the relevant art(s) how to implement the claimed invention in alternative embodiments. Thus, the claimed invention should not be limited by any of the above described example embodiments.

In addition, it should be understood that any figures, graphs, tables, examples, etc., which highlight the functionality and advantages of the claimed invention, are presented for example purposes only. The architecture of the disclosed is sufficiently flexible and configurable, such that it may be utilized in ways other than that shown. For example, the steps listed in any flowchart may be reordered or only optionally used in some embodiments.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the claimed invention of the application. The Abstract is not intended to be limiting as to the scope of the claimed invention in any way.

Furthermore, it is the applicants' intent that only claims that include the express language "means for" or "step for" be interpreted under 35 U.S.C. §112, paragraph 6. Claims that do not expressly include the phrase "means for" or "step for" are not to be interpreted under 35 U.S.C. §112, paragraph 6.

A portion of the claimed invention of this patent document contains material which is subject to copyright protection. The copyright owner has no objection to the facsimile reproduction by anyone of the patent document or the patent invention, as it appears in the Patent and Trademark Office patent file or records, but otherwise reserves all copyright rights whatsoever.

What is claimed is:

1. An asbestos containment composition for sequestering and aggregating asbestos comprising:
    a. at least one 2:1 layer phyllosilicate mineral;
    b. at least one 1:1 layer phyllosilicate mineral; and
    c. water; and
    d. wherein the ratio of the 2:1 layer phyllosilicate mineral to the 1:1 layer phyllosilicate mineral is about 30:70 weight percent to about 70:30 weight percent; and
    e. wherein the ratio of the 2:1 layer phyllosilicate mineral and the 1:1 layer phyllosilicate mineral to the water is about 10:90 weight percent.

2. The asbestos containment composition according to claim 1, wherein the 2:1 layer phyllosilicate mineral is montmorillonite.

3. The asbestos containment composition according to claim 1, wherein the 1:1 layer phyllosilicate mineral is kaolinite.

4. The asbestos containment composition according to claim 1, further including an antibacterial agent.

5. The asbestos containment composition according to claim 1, further including titanium oxide powder.

6. A method for creating an asbestos containment composition comprising:
    a. creating a clay aqueous suspension by mixing at least one 2:1 layer phyllosilicate mineral with at least one 1:1 layer phyllosilicate mineral in a ratio of about 30:70 weight percent to about 70:30 weight percent with water;
    b. mechanically separating grains from the clay aqueous suspension;
    c. sonicating the clay aqueous suspension for homogenization for at least about 5 minutes; and
    d. sterilizing the clay aqueous suspension.

7. The method according to claim 6, wherein the 2:1 layer phyllosilicate mineral is montmorillonite.

8. The method according to claim 6, wherein the 1:1 layer phyllosilicate mineral is kaolinite.

9. The method according to claim 6, wherein the ratio between the 2:1 layer phyllosilicate mineral and the 1:1 layer phyllosilicate mineral to the water is at about 10:90 weight percent.

10. The method according to claim 6, further including separating the grains from the clay aqueous suspension magnetically.

11. The method according to claim 6, further including treating the clay aqueous suspension with an antibacterial agent.

12. The method according to claim 6, further including adding titanium oxide powder to the clay aqueous suspension.

* * * * *